April 5, 1960

R. E. MAYO 2,931,127

INSECT CATCHERS

Filed May 7, 1958

INVENTOR.
REUBIN E. MAYO
BY
J. Hanson Boyden,
ATTORNEY

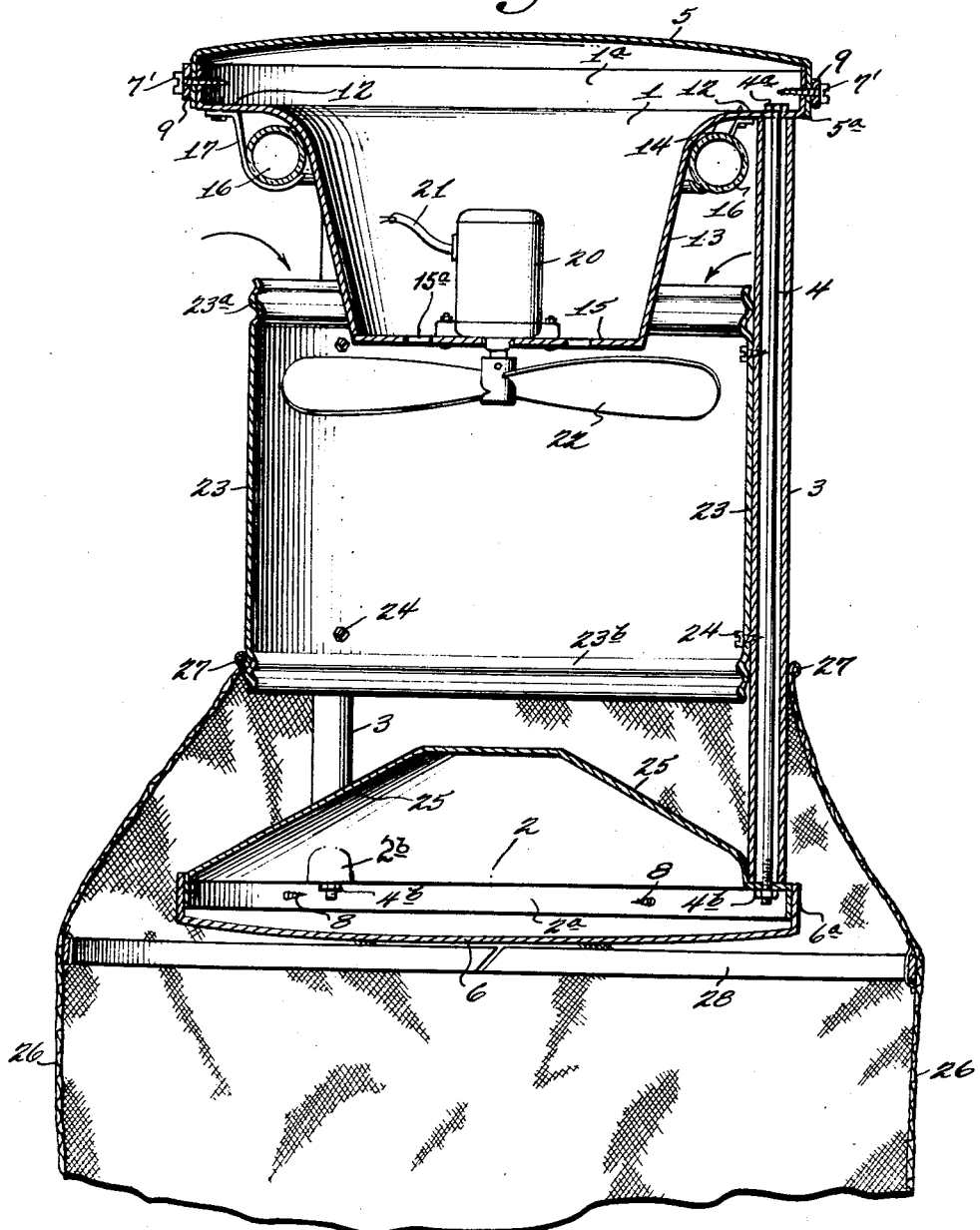

April 5, 1960
R. E. MAYO
2,931,127
INSECT CATCHERS
Filed May 7, 1958
3 Sheets-Sheet 3
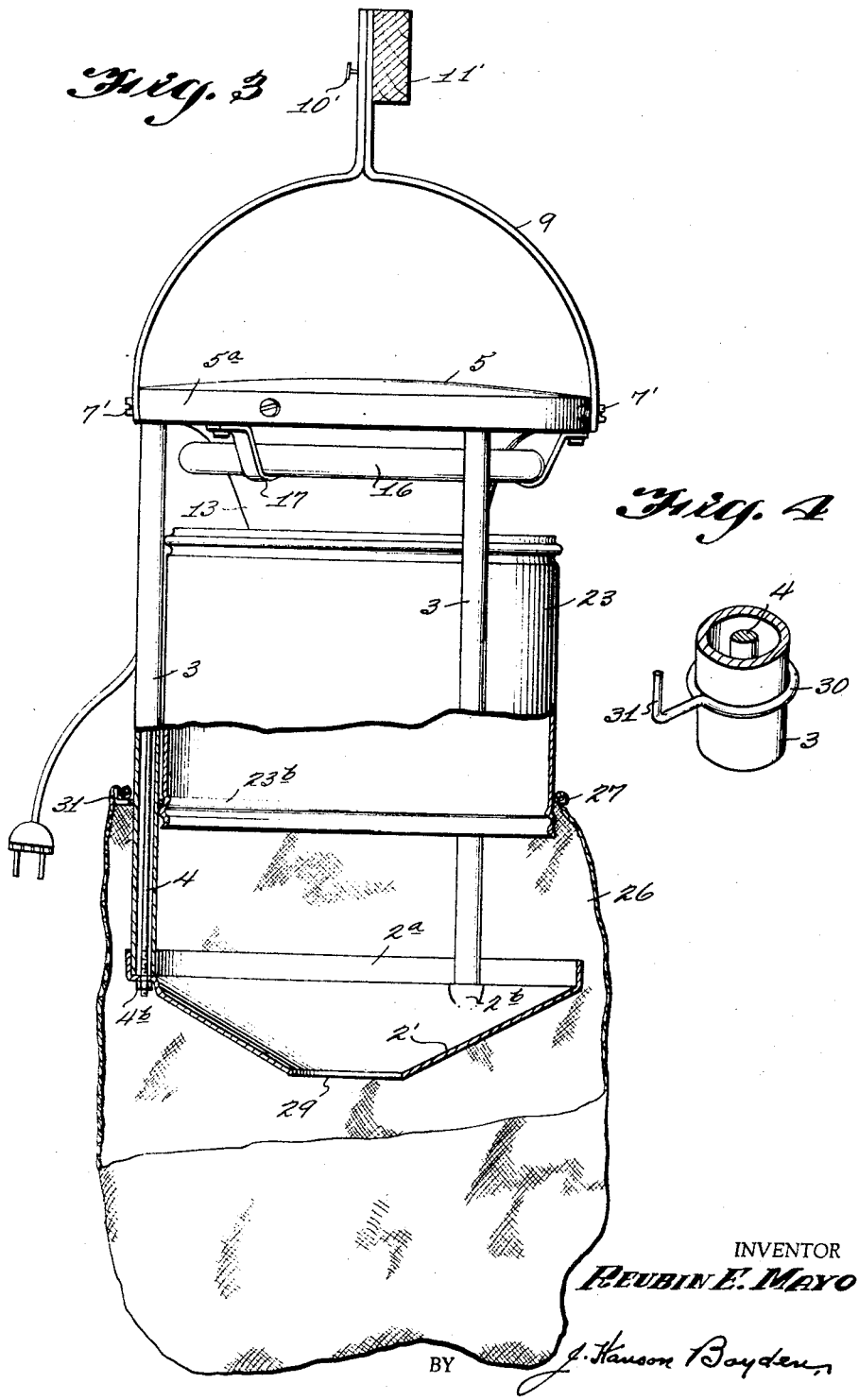
INVENTOR
*Reubin E. Mayo*
BY *J. Hanson Boyden*
ATTORNEY.

United States Patent Office 2,931,127
Patented Apr. 5, 1960

2,931,127

INSECT CATCHERS

Reubin E. Mayo, Farmville, N.C.

Application May 7, 1958, Serial No. 733,639

7 Claims. (Cl. 43—139)

This invention relates to insect catchers or traps, and more particularly to apparatus for catching and destroying winged insects which fly at night.

The apparatus comprises an elongated housing in which is mounted a motor-driven suction fan, the housing having a lamp arranged at one end and a receptacle adjacent the other end, whereby insects, attracted by the light of the lamp, are drawn into the housing by the fan and discharged into said receptacle.

In apparatus of this general type heretofore proposed, it has been the usual practice to mount the housing in a horizontal position, so that the light from the lamp has been emitted in one direction only, namely, the direction in which the housing is pointed. In other words, in this prior apparatus, the beams from the lamp have been directed forwardly, perhaps a little to the sides, but not at all to the rear.

An object of the present invention is, therefore, to devise apparatus in which the beams from the lamp are radiated freely in all horizontal directions, so that there is no spot at all in the area surrounding the trap from which the insects cannot see the light. To accomplish this, I mount my elongated housing vertically, instead of horizontally, with the light at the upper end exposed on all sides. More specifically, I employ a circular tubular lamp disposed in a horizontal plane and surrounding a part of the housing, so that there is nothing to obstruct the light in any direction. In addition, I provide the housing with an annular opening just below the circular lamp through which opening the insects attracted by the lamp are drawn into the housing by the suction created by the fan positioned within the housing.

A further object is to devise an improved receptacle arrangement for catching and retaining the insects discharged by the fan.

Yet another object of the invention is to provide apparatus of this nature which is exceptionally efficient in operation, of simple construction, easy to assemble, and relatively low in cost.

All insect catchers are used outside and are exposed to rainstorms and other weather conditions. A still further object of the invention is to provide an insect catcher of this type so designed that the delicate component parts such as the circular lamp itself, ballast, motor and control switches are fully protected from the weather, so as to insure maximum life to such parts.

With the above and other objects in view, and to improve generally on the details of such apparatus, the invention consists in the construction and combination of parts hereinafter described and claimed, and illustrated in the accompanying drawings, forming part of this specification, and in which:

Fig. 2 is a vertical section through the same substantially on the line 2—2 of Fig. 1, and on a somewhat enlarged scale, the lower part being broken away.

Fig. 3 is a view generally similar to Fig. 1, partly in elevation and partly in section, showing a slightly modified form of the invention; and Fig. 4 is a perspective view of one of the hooks used for supporting the receptacle.

Figure 1:
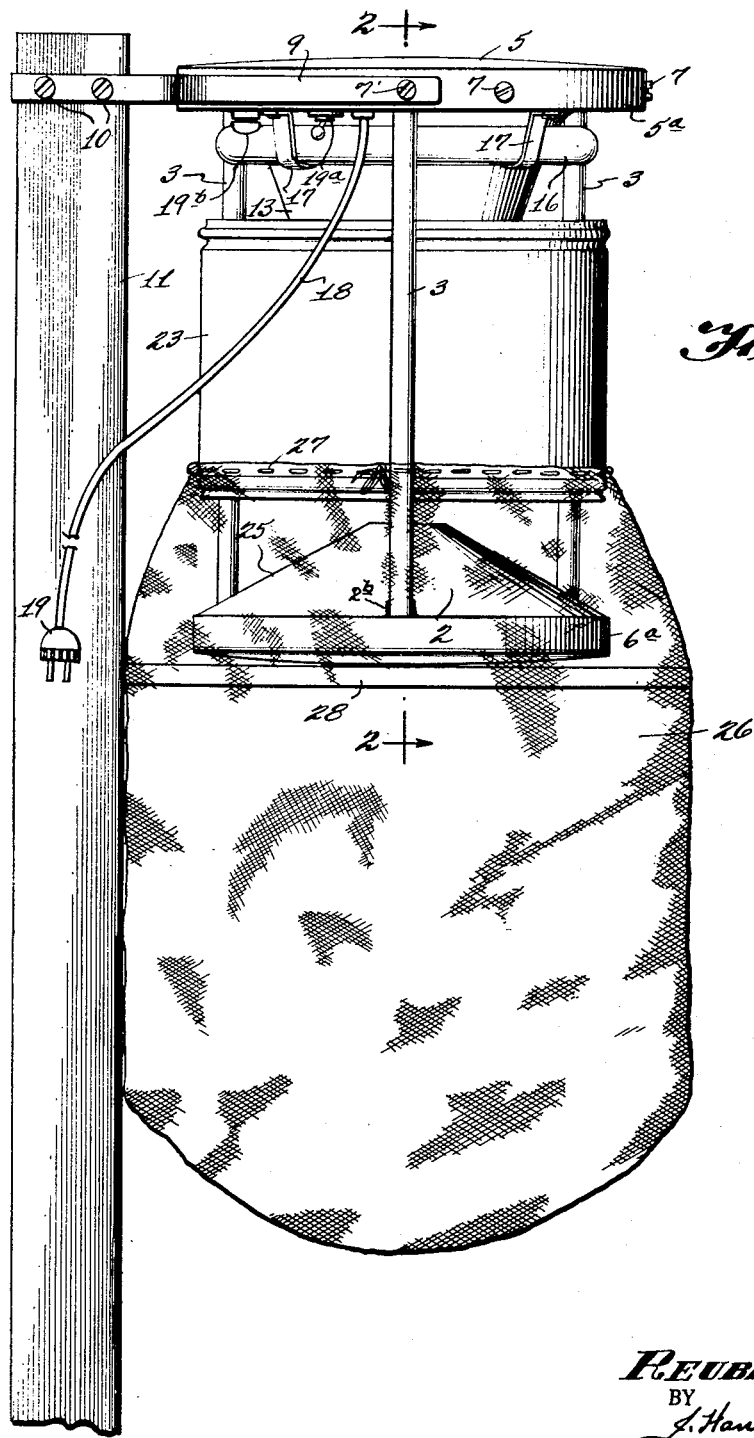
Fig. 1 is a side elevation of one form of my improved insect catcher complete, as it appears when installed.

Referring to the drawings in detail, my improved apparatus, as shown in Figs. 1 and 2, comprises a pair of end members 1 and 2 preferably formed as sheet metal stampings. These end members are held rigidly together in spaced relation by means of three or more hollow tubular posts 3 having tie rods 4 extending through the same and secured to the end members by heads $4^a$ and nuts $4^b$.

The upper member 1 is formed with an upstanding peripheral flange $1^a$, over which fits the flange $5^a$ of a dome-shaped cover 5.

Similarly, the lower end member 2 is formed with a downwardly extending peripheral flange $2^a$, over which fits the flange $6^a$ of a bottom cover plate 6.

The flanges $1^a$ and $5^a$ are fastened together by means of screws 7, while the flanges $2^a$ and $6^a$ are secured together by means of screws 8.

Pivot screws 7' connect the upper member of the housing with the arms of a forked or Y-shaped supporting member 9. The stem of this member may be secured to an upright post 11 by means of screws 10, as shown in Fig. 1, the entire housing being suspended from the screws 7' in a vertical position.

Referring more particularly to Fig. 2, it will be seen that the upper end member or stamping 1 is of inverted frustro-conical shape, having downwardly tapering sides 13 above which is a concave portion 14 terminating in a substantially horizontal portion 12 through which the tie rods 4 pass, and which rests upon the posts 3. The lower end or bottom of the member or stamping 1 is closed, as shown at 15.

A circular, tubular electric lamp 16 encircles or surrounds the end member 1 at a point adjacent the concave portion 14 thereof, and is held in place by clips 17 secured to the horizontal portion 12 of the said member. Electric current is supplied by means of a cord 18 having a plug 19 at its end. Two separate switches $19^a$ and $19^b$ (Fig. 1) are preferably provided, one for controlling the circuit of the lamp 16 and the other for controlling the circuit of a motor hereinafter described.

Referring again to Fig. 2, it will be seen that I provide an electric motor 20 enclosed within the member 1 and supported on the bottom 15 thereof. This bottom is shown as provided with a series of holes $15^a$ to supply air to the motor and to the usual lamp "ballast" (not shown) which may be housed within the member 1. Current is supplied to this motor through wires 21 the supply of current to which is controlled by one of the above-mentioned switches.

The motor shaft extends down through the bottom 15 and carries at its lower end a fan 22. This fan revolves within a cylindrical drum 23, open at its ends, and secured to the posts 3 by means of screws 24. The upper and lower ends of this drum are preferably grooved or beaded, as shown at $23^a$ and $23^b$.

It will be further noted that the lower portion of the frustro-conical member 1, which is of smaller diameter than the drum 23, extends down into the upper open end of this drum. This forms an annular opening between the sides 13 of the member 1 and the upper end $23^a$ of the drum 23, this annular opening being directly under the lamp 16 but spaced a substantial distance therefrom.

A receptacle 26 in the nature of a porous flexible bag, formed of netting or the like, is secured to the lower end of the drum 23, as by means of a drawstring 27 fitting in the groove $23^b$. The lower end member 2 is shown as of slightly larger diameter than the drum 23, and the bag 26, in turn, is somewhat larger than said end member. The sides of the bag are held away or spaced from the periphery of said end member by means of a hoop 28, thus forming an annular passageway through which the insects may be discharged by the fan from the lower end of said drum into said bag. The upper surface of said lower end member 2 is preferably of frustro-conical shape, having downwardly inclined sides 25 which serve to deflect and guide the insects into said annular passageway. Pockets 2ᵇ are formed at the lower edge of the inclined sides to receive the posts 3.

It will be noted that my improved housing is of exceptionally simple construction, being made up of the two end members and the drum 23, all rigidly connected and held in spaced relation by means of the tubular posts 3.

The operation of the apparatus will be obvious. Insects attracted by the light of the lamp, and flying toward it, are drawn in through the space between the lamp and upper edge of the drum by the suction created by rotation of fan 22, and are directed downwardly by the conical sides 13 of the member 1 into and through the annular opening between the drum and the lower part of such member. The insects are then discharged by the fan from the bottom end of the drum and driven through the annular passageway around the lower end member into the bag.

It will be particularly noted that while the lamp, motor, and other delicate parts are fully protected from the weather by the member 1 and cover 5, the lamp is completely exposed on all sides, and the light emanates horizontally in all directions, so that it may be seen by insects in the entire surrounding area. Moreover, the concave portion 14 of the member 1, which may be finished with white enamel, acts as a reflector to direct the light rays outwardly and downwardly.

In Fig. 3 I have shown a slightly modified arrangement, in which the supporting member 9 is illustrated as swung up 90° from the position shown in Fig. 1 and hung on a nail or the like 10', carried by horizontal beam 11'.

Instead of the upright frustro-conical end member 2, shown in Figs. 1 and 2, I may invert or reverse this member as illustrated at 2' in Fig. 3, and in this case I form it with its small end open, as indicated at 29, the bottom plate 6 of Fig. 2 being, of course, omitted. With the end member arranged in this way, it is not necessary to employ the hoop 28 to hold the bag away from the periphery thereof, since the insects are discharged downwardly into the bag through the opening 29.

Although the lower end member is shown at 2 in Fig. 2 as having its small end closed, and at 2' in Fig. 3 as having its small end open, the identical member 2', illustrated in Fig. 3 can be employed in Fig. 2 merely by reversing the same, since there would be no practical objection to having the small end open in the arrangement of Fig. 2. The posts 3 and rods 4 cooperate with the pockets 2ᵇ in both cases, the posts merely engaging opposite sides of the pockets when the end member is reversed.

Also in Fig. 3 I have shown an additional means for supporting the bag 26. This consists of hooks 31 carried by rings 30, which fit over the posts 4, and are prevented from slipping downward by the bead 23ᵇ on the drum 23. When using the hooks 31, the drawstring 27 may or may not be employed.

What I claim is:

1. Apparatus for catching flying insects comprising a composite elongated housing, means for supporting said housing in substantially vertical position, said housing being made up of a central open ended drum and upper and lower end members spaced therefrom, said upper end member being of inverted frustro-conical shape, with its lower end, which is of smaller diameter than its upper end and of smaller diameter than said drum, projecting down into the upper end of said drum, thus forming an annular opening between said upper end member and the upper end of said drum, said upper end member having a closed bottom, a circular tubular lamp surrounding said frustro-conical end member at a point above and spaced from said annular opening, a cover plate overlying said lamp and upper end member, a motor enclosed within said upper end member and mounted on the closed bottom thereof, a suction fan driven by said motor and disposed within said drum below said upper end member, whereby insects attracted by said lamp are drawn in by said fan through said annular opening and discharged downwardly through said drum, and a porous receptacle communicating with the lower end of said drum for retaining the insects thus discharged, said receptacle surrounding the periphery of said lower end member.

2. Apparatus for catching flying insects as defined in claim 1, wherein said porous receptacle comprises a porous bag having its open end surrounding and secured to the lower end of said drum, and wherein means are provided below the lower end member for maintaining the wall of said porous bag spaced from the periphery of said lower end member to provide between the wall of said porous bag and the periphery of said lower end member an annular passageway through which the insects may enter the lower portion of said porous bag.

3. Apparatus for catching flying insects as defined in claim 2, wherein the upper surface of said lower end member is of frustro-conical configuration to deflect the insects into the annular passageway between the wall of said porous bag and the periphery of said lower end member.

4. Apparatus for catching flying insects as defined in claim 1, wherein said upper and lower end members are connected together by tubular posts having tie rods extending therethrough for rigidly connecting said end members together in vertically spaced and substantially parallel relation, and wherein said central open ended drum is secured to said posts.

5. Apparatus for catching flying insects as defined in claim 1, wherein said lower end member is of inverted, frustro-conical configuration and has a central opening through the bottom thereof through which the insects are discharged into said porous receptacle.

6. Apparatus for catching flying insects comprising a composite elongated housing, means for supporting said housing in substantially vertical position, said housing including a central, open ended drum and an upper end member of inverted frustro-conical configuration having its upper part spaced above the drum, the lower part of said upper end member being of smaller diameter than the upper part thereof and of smaller diameter than said drum, and projecting down into the upper end of said drum, thus forming an annular opening between the lower part of said upper end member and said drum, the bottom of said end member being closed, a circular, tubular lamp surrounding said end member at a point above and spaced from said annular opening, a motor enclosed within said inverted frustro-conical upper end member and mounted on the closed bottom thereof, a suction fan in said drum below said annular opening and driven by said motor, whereby insects, attracted by said lamp, are drawn by said fan in through said annular opening and discharged downwardly, and a porous receptacle communicating with the lower end of said drum for retaining the insects thus discharged.

7. Apparatus for catching flying insects as defined in claim 6, wherein the means for supporting said housing in substantially vertical position comprises a substantially Y-shaped member including a central stem and a pair of arms diverging from an end of said stem, the outer, free ends of said arms being pivotally connected to said housing whereby said substantially Y-shaped member may swing about the pivotal mountings at the outer, free ends of said arms to assume a vertical or horizontal position to permit selective attachment of the free end of said central stem to either a vertical or horizontal support.

References Cited in the file of this patent

UNITED STATES PATENTS

| | | |
|---|---|---|
| 1,693,368 | Cherry | Nov. 27, 1928 |
| 2,780,026 | Dail et al. | Feb. 5, 1957 |

FOREIGN PATENTS

| | | |
|---|---|---|
| 662,897 | Great Britain | Dec. 12, 1951 |